(12) United States Patent
Wang

(10) Patent No.: US 6,930,429 B2
(45) Date of Patent: Aug. 16, 2005

(54) MOTOR ARMATURE HAVING DISTRIBUTED WINDINGS FOR REDUCING ARCING

(75) Inventor: Ren Hong Wang, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/613,187

(22) Filed: Jul. 3, 2003

(65) Prior Publication Data

US 2004/0017124 A1 Jan. 29, 2004

Related U.S. Application Data

(60) Continuation of application No. 10/404,857, filed on Apr. 1, 2003, which is a division of application No. 09/594,357, filed on Jun. 14, 2000, now Pat. No. 6,566,782.

(51) Int. Cl.$^7$ .............................. H02K 1/10; H02K 3/38
(52) U.S. Cl. ........................ 310/225; 310/198; 310/234
(58) Field of Search ................................ 310/225, 206, 310/198, 184, 180, 179, 220, 222, 224, 234, 158; 29/598, 605, 606

(56) References Cited

U.S. PATENT DOCUMENTS

| | | | |
|---|---|---|---|
| 841,545 A | 1/1907 | Latour | 310/225 |
| 1,742,112 A | 12/1929 | Welsch | 310/198 |
| 2,103,166 A | 12/1937 | Morrill | 310/206 |
| 2,272,749 A | 2/1942 | Lane et al. | 310/225 |
| 2,598,464 A | 5/1952 | Thomas | 310/206 |
| 2,921,207 A | 1/1960 | Fletcher | 310/206 |
| 3,631,278 A | 12/1971 | Snively | 310/158 |
| 4,292,559 A | 9/1981 | Auinger et al. | 310/206 |
| 4,417,388 A | 11/1983 | Major | 310/598 |
| 4,437,029 A | 3/1984 | Ban et al. | 310/198 |
| 4,447,751 A | 5/1984 | Ban et al. | 310/154 |
| 4,507,565 A | 3/1985 | Hamano | 290/38 |
| 4,583,016 A | 4/1986 | Ban et al. | 310/198 |
| 4,933,586 A | 6/1990 | Gotou | 310/198 |
| 5,172,870 A * | 12/1992 | Van Assema | 310/198 |
| 5,376,852 A | 12/1994 | Kawamura et al. | 310/198 |
| 6,566,782 B1 | 5/2003 | Wang | 310/225 |

FOREIGN PATENT DOCUMENTS

| | | | | |
|---|---|---|---|---|
| CN | 86203906 | 2/1987 | | H02K/17/14 |
| CN | 2054227 | 3/1990 | | H02K/3/28 |
| DE | 109 482 | 1/1974 | | H02K/27/22 |
| DE | 0 025 452 | 8/1984 | | H02K/23/26 |
| DE | 37 12 652 | 12/1989 | | H02K/3/00 |
| DE | 90 03 164.4 | 8/1991 | | H02K/23/26 |
| DE | 197 05 161 | 1/1998 | | H02K/23/26 |
| DE | 198 18 104 | 6/1999 | | H02K/23/26 |
| EP | 0 415 493 | 1/1994 | | H02K/15/09 |
| EP | 1164685 | * 12/2001 | | H02K/3/28 |

* cited by examiner

*Primary Examiner*—Karl I. E. Tamai
(74) *Attorney, Agent, or Firm*—Harness, Dickey & Pierce, P.L.C.

(57) ABSTRACT

An armature for a brush commutated electric motor having a distributed coil winding arrangement for reducing brush arcing and electromagnetic interference (EMI). The winding pattern involves segmenting each coil into first and second subcoil portions with differing pluralities of turns. Each subcoil portion is wound around separate pairs of spaced apart slots of a lamination stack. Adjacent coils are wound such that one subcoil portion of each is wound in a common slot to therefore form an overlapping arrangement of each pair of adjacently coils. The winding pattern serves to "shift" the resultant magnetic axes of each coil in such a manner so as to significantly reduce brush arcing and the EMI resulting therefrom. The reduction in EMI is sufficient to eliminate the need for EMI reducing components, such as chokes, which have typically been required to maintain EMI to acceptably low levels. Commutation efficiency is also improved by the distributed winding pattern described above because of the reduction in the unevenness of the magnetic coupling between adjacent coils.

13 Claims, 10 Drawing Sheets

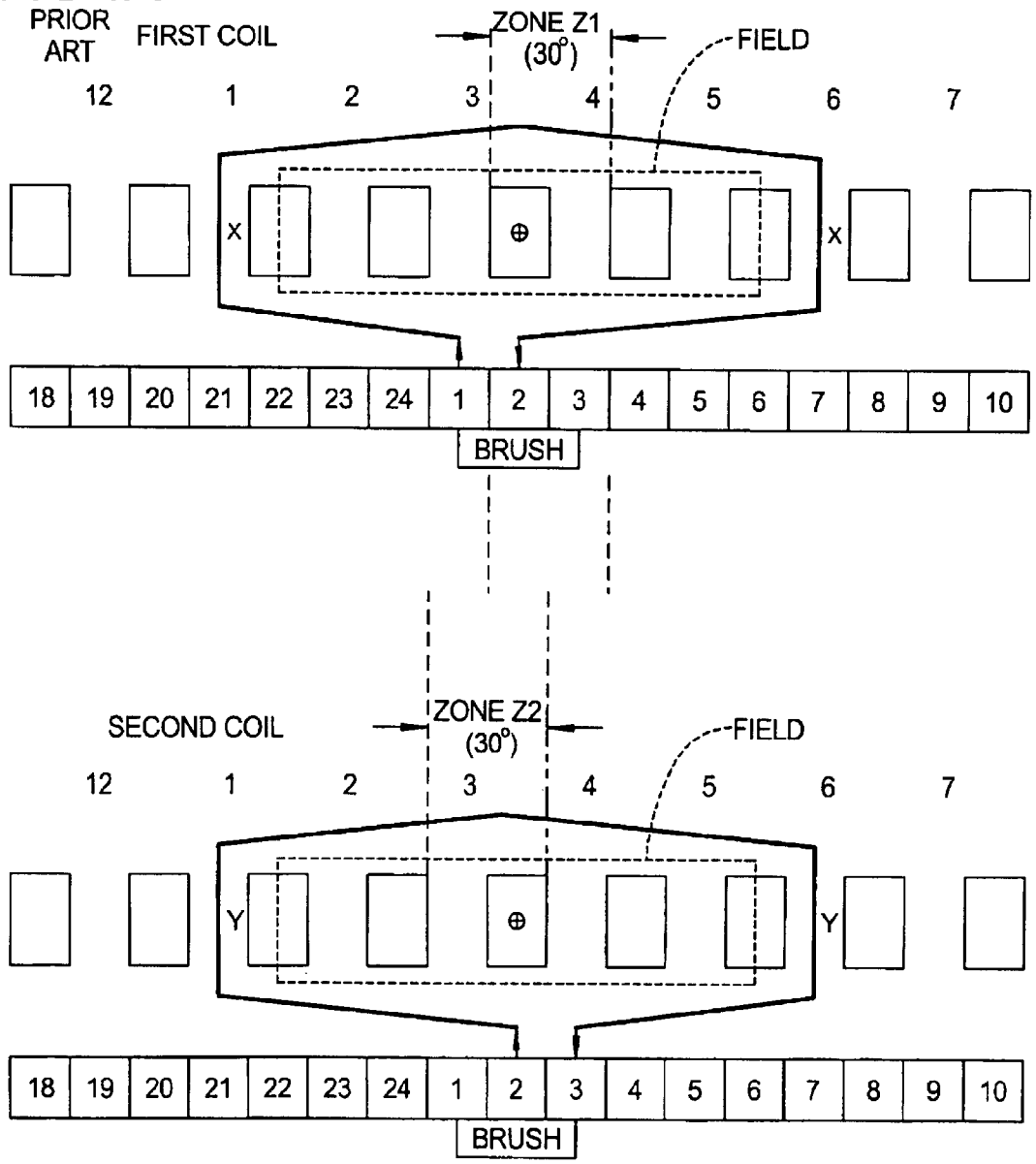

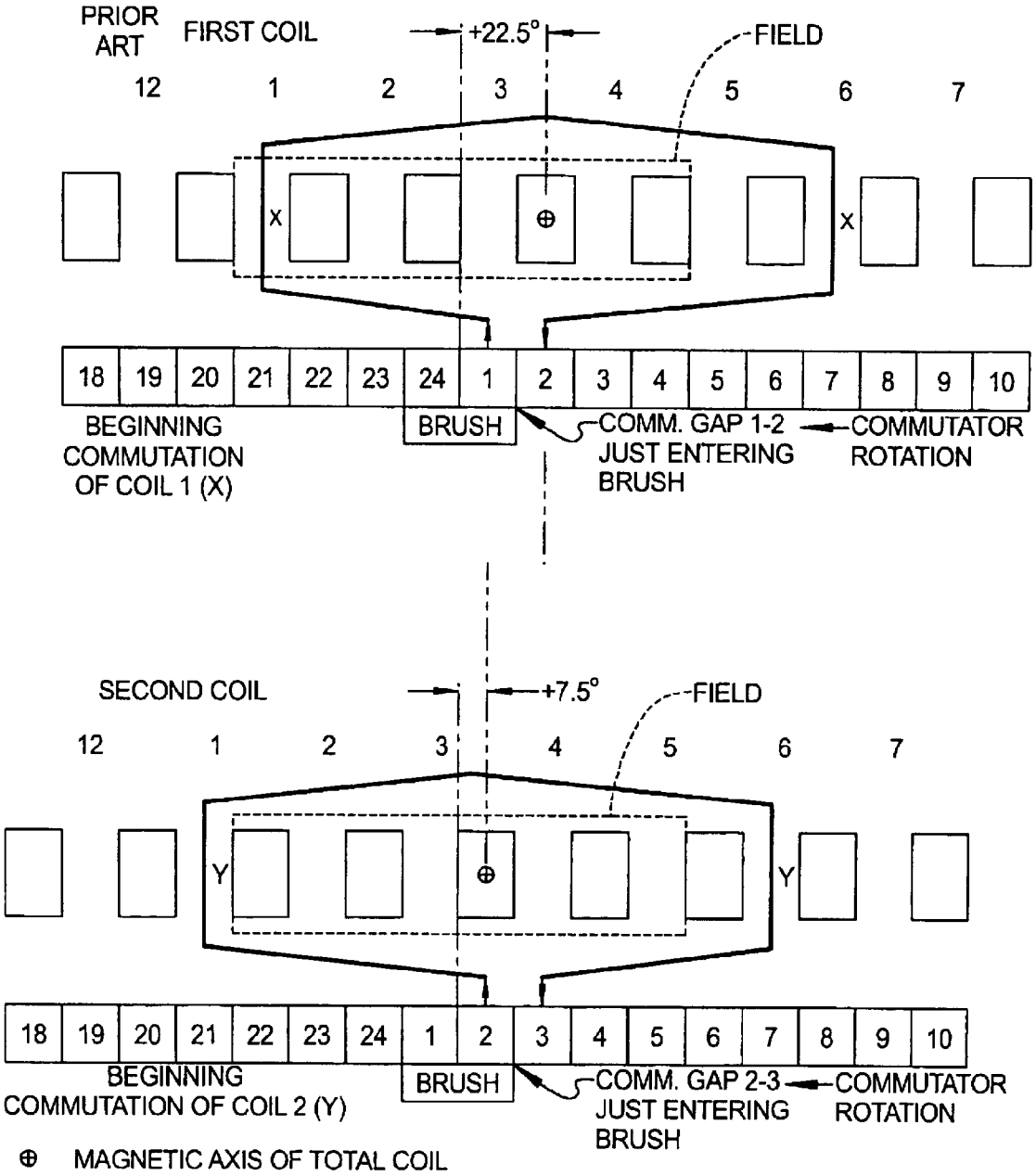

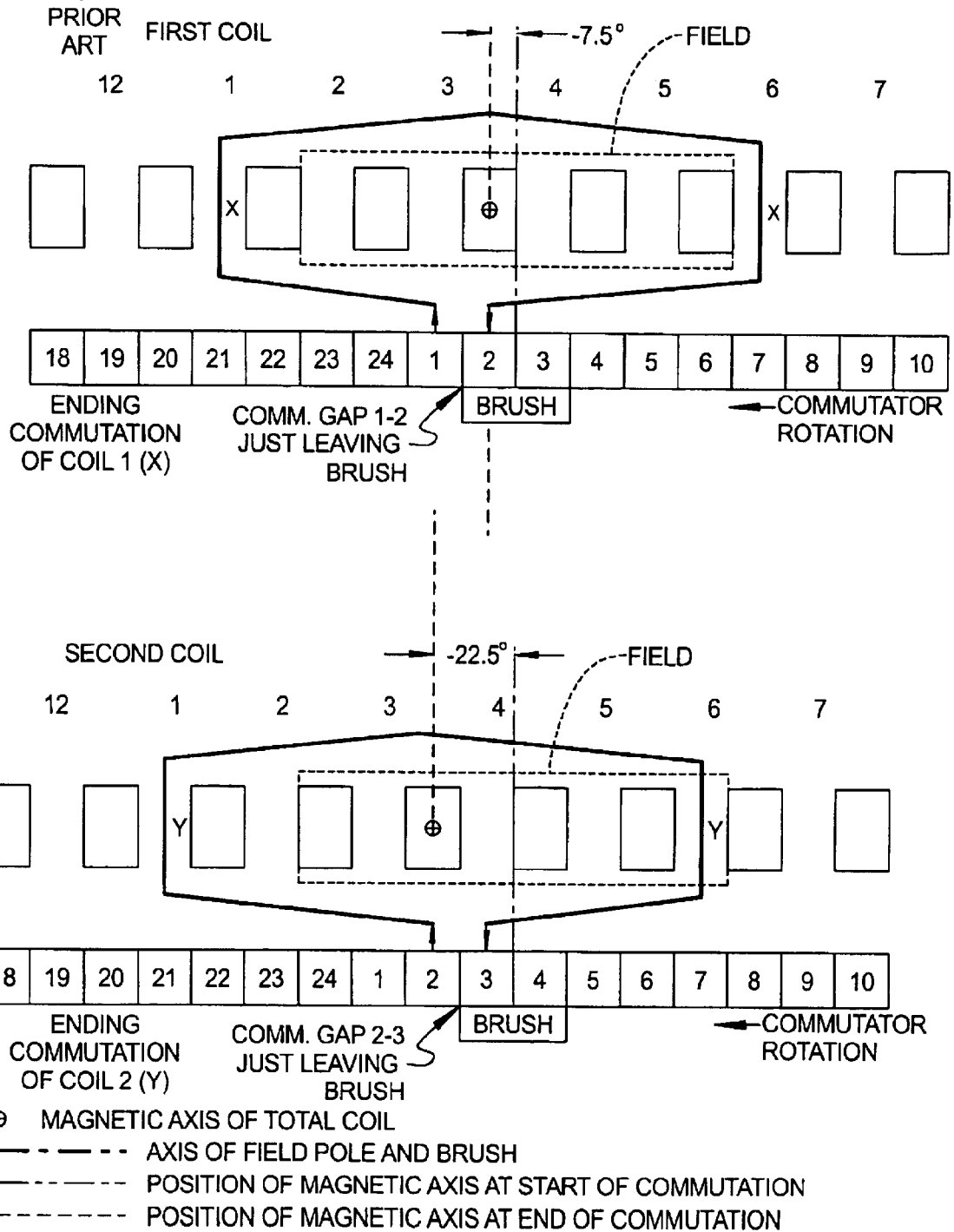

☆ MAGNETIC AXIS OF LARGER SUBCOIL
+ MAGNETIC AXIS OF SMALLER SUBCOIL
⊕ MAGNETIC AXIS OF TOTAL COIL (RESULTANT)
—·—·— AXIS OF FIELD POLE AND BRUSH
— — — POSITION OF MAGNETIC AXIS AT START OF COMMUTATION
- - - - - POSITION OF MAGNETIC AXIS AT END OF COMMUTATION

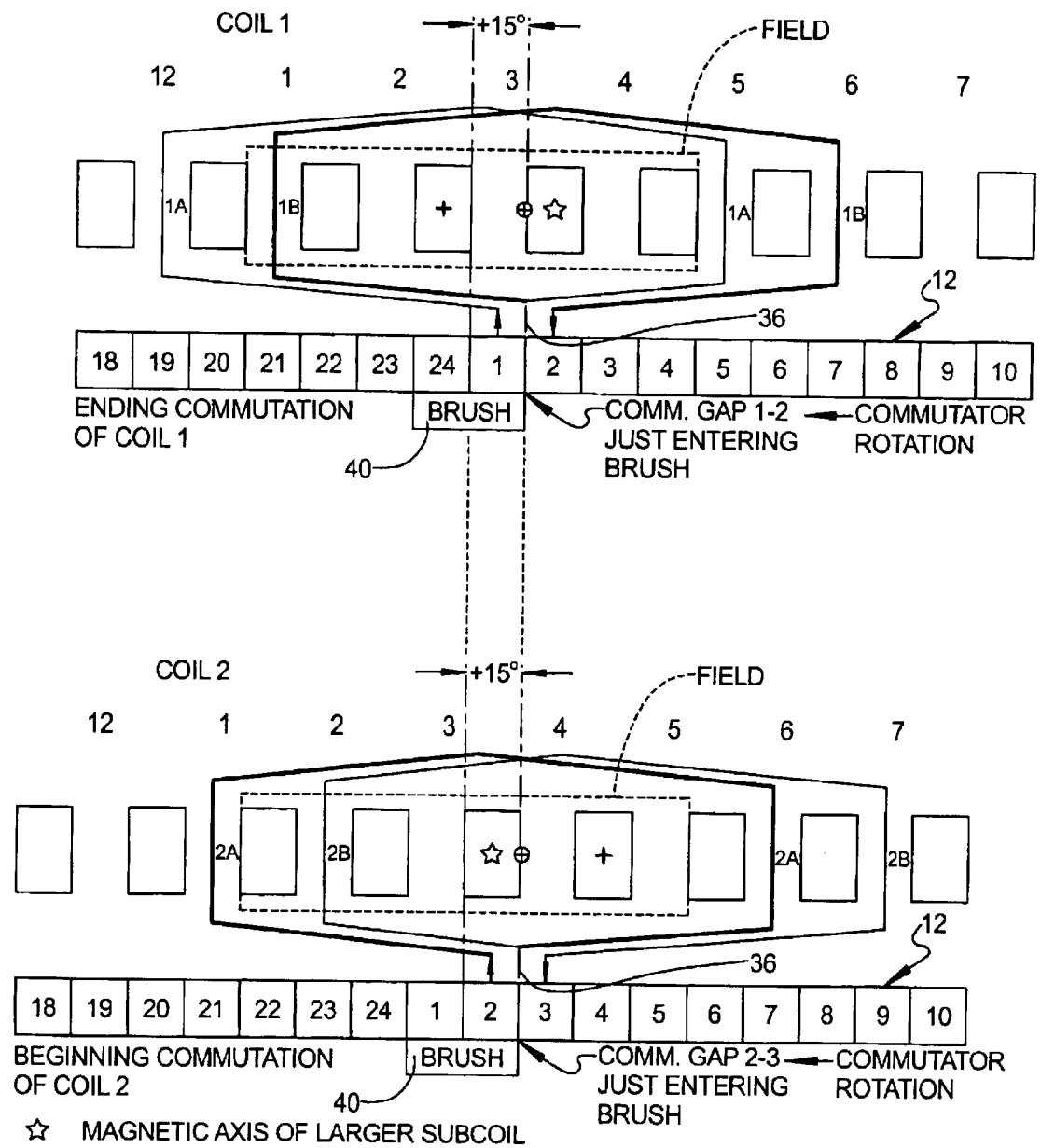

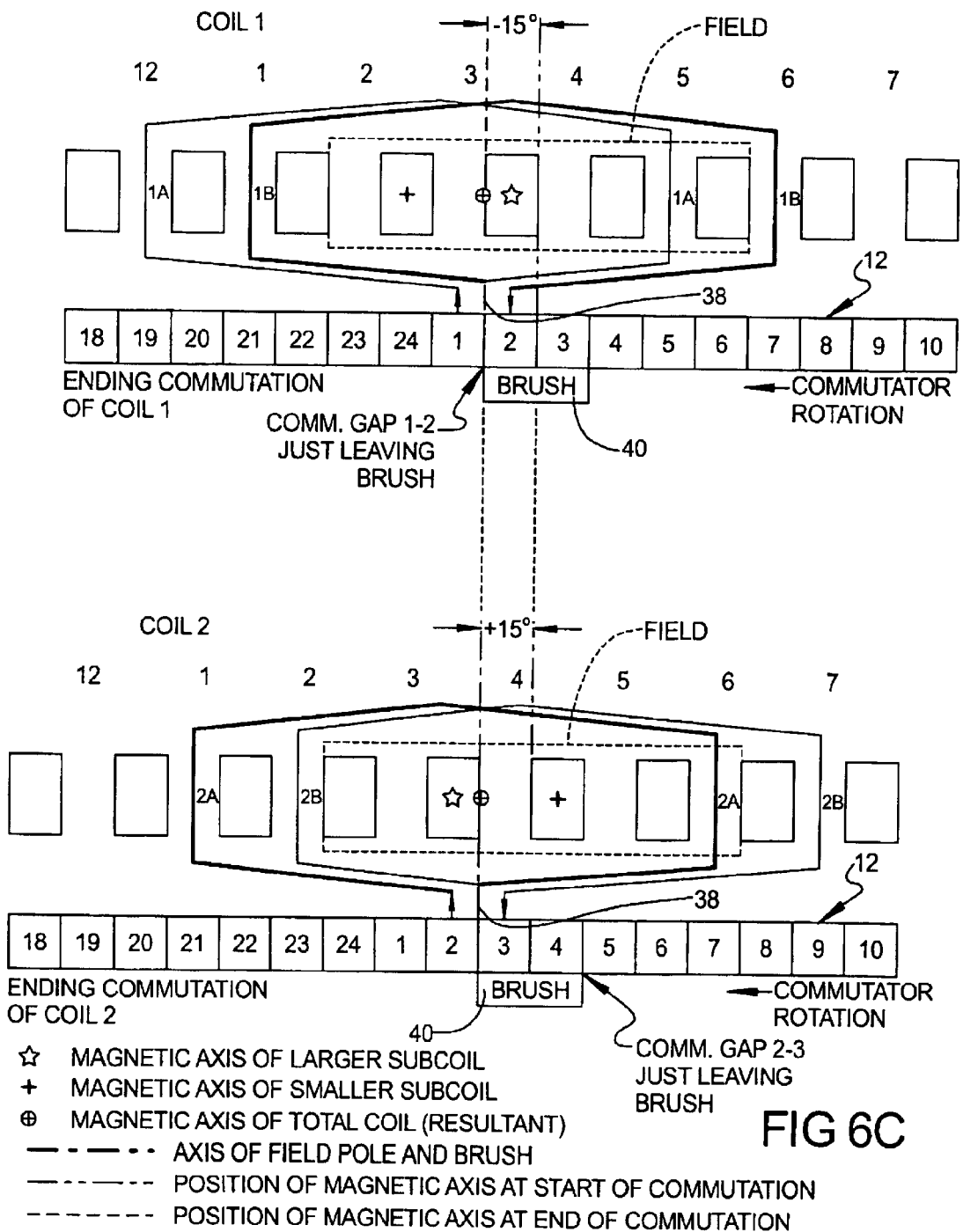

US 6,930,429 B2

MOTOR ARMATURE HAVING DISTRIBUTED WINDINGS FOR REDUCING ARCING

CROSS-REFERENCE TO RELATED APPLICATIONS

This application is a continuation of U.S. Ser. No. 10/404,857, filed on Apr. 1, 2003 and presently, which is a divisional of U.S. Ser. No. 09/594,357, filed Jun. 14, 2000, which issued as U.S. Pat. No. 6,566,782 on May 20, 2003.

TECHNICAL FIELD

This invention relates to electric motors, and more particularly to a winding pattern for winding the coils on an armature in a manner to reduce electromagnetic interference and arcing at the brushes in contact with the commutator of the armature.

BACKGROUND OF THE INVENTION

Present day brush commutated electric motors include an armature having a plurality of coils wound in slots formed in the lamination stack of the armature. With traditional motor designs, the lamination stack of the armature forms a plurality of circumferentially arranged slots extending between adjacent pairs of lamination posts. Typically, two coils per slot are used when winding the armature coils on the lamination stack. Among the two coils of the same slot, the one which commutates first is referred to as the first coil and the one which commutates second as the second coil. The second coil has inherently poorer magnetic commutation than the first coil because the second coil passes beyond the magnetic neutral zone within the stator before it finishes commutation. This is illustrated in simplified fashion in FIG. 1, wherein the commutation region of the first coil is designated by $Z_1$ and the commutation region of the second coil is designated by $Z_2$. A rotor "R" is shown positioned within a stator "S" having field coils "F". This is further illustrated in FIGS. 1a–1f. FIGS. 1a and 1b illustrate the position of the magnetic axis of the first and second coils, respectively, relative to the commutation regions $Z_1$ and $Z_2$ of each coil. FIGS. 1c and 1d illustrate the position of the magnetic axis of each of the first and second coils, relative to the field pole and brush, at the start of commutation of each coil. The magnetic axis of the first coil, in this example, is retarded about 22.5 degrees from the axis of the field pole and the brush (FIG. 1c), while for the second coil, its magnetic axis is only retarded about 7.5 degrees relative to the field pole and brush (FIG. 1d). FIG. 1e shows the angular position of the magnetic axis of the first coil, relative to the field pole, when the first coil ends commutation. FIG. 1f shows the angular position of the magnetic axis of the second coil, relative to the field pole and brush, when the second coil ends commutation. The angular position of the second coil, when it ends commutation, is clearly past the angular position, relative to the field pole, at which the first coil ends its commutation. The two regions $Z_1$ and $Z_2$ are not commonly angularly aligned (i.e., coincident) relative to the field pole and brush. As a result, the second coil commutation can generate significant brush arcing, and becomes the dominant source of the total brush arcing of the motor. This can also cause electro-magnetic interference (EMI) to be generated which exceeds acceptable levels set by various government regulatory agencies. This brush arcing can also lead to accelerated brush wear.

Accordingly, it is a principal object of the present invention to provide an armature for a brush commutated electric motor having a plurality of coils wound thereon in a unique sequence which serves to significantly reduce brush arcing and improve the commutation efficiency of the motor.

It is a further object of the present invention to provide an armature for a brush commutated electric motor which incorporates a unique winding pattern for the coils wound on the armature in a manner which does not otherwise require modification of any component of the armature or the need for additional components.

It is still a further object of the present invention to provide a winding pattern for the armature coils of an armature which allows EMI components usually required to sufficiently attenuate the EMI generated by brush arcing to be eliminated, thus allowing the motor to be constructed less expensively and with fewer components.

SUMMARY OF THE INVENTION

The above and other objects are provided by an armature for a brush commutated electric motor incorporating a unique, distributed winding pattern for the coils thereof, in accordance with a preferred embodiment of the present invention. The winding pattern involves segmenting each coil into first and second subcoil portions. With a first coil, the first subcoil portion is wound around two spaced apart slots for a first plurality of turns and the second subcoil portion is wound around a second pair of spaced apart slots which are shifted circumferentially from the first pair of slots. The second subcoil portion is also formed by a different plurality of winding turns than the first subcoil portion. The two subcoil portions are wound in series with one end coupled to a first commutator segment of the armature and the other end coupled to a second commutator segment.

A second coil is also divided into first and second subcoil portions, with the first subcoil portion being wound with the same number of turns as the second subcoil portion of the first coil, and in the second pair of spaced apart slots. The second subcoil portion of the second coil, however, is laterally shifted such that it is wound in a third pair of spaced apart slots shifted laterally by one slot from the second pair of slots. The second subcoil portion of the second coil is also wound a plurality of turns in accordance with that of the first portion of the first coil. One end of the first subcoil portion of the second coil is coupled to commutator segment number two while the end of subcoil portion two of coil two is coupled to commutator segment number three.

Coil number three is segmented into first and second subcoil portions with the first subcoil portion being wound a number of turns in accordance with the second subcoil portion of the second coil, and wound around the second pair of spaced apart slots. The second subcoil portion of the third coil is wound around the third pair of spaced apart slots but with a number of turns in accordance with the first subcoil portion of the second coil. The end of the first subcoil portion of the third coil is coupled to commutator segment number three while the end of the second subcoil portion of coil three is coupled to commutator segment number four.

The above winding pattern continues in alternating fashion such that an overlapping of the coils occurs around the lamination stack. In effect, all of the first subcoil portions shift their magnetic axes forward with respect to rotation of the armature, and all of the second coil portions shift their magnetic axes backward relative to the direction of armature rotation. With a desired turns ratio between the two subcoil portions of each coil, which ratio may vary considerably but is preferably about 3:1, the above described winding pattern smoothes out the "unevenness" in the magnetic coupling between adjacent armature coils, thus improving commutation efficiency. This also improves the commutation efficiency for the second subcoil portion of each coil, thus reducing brush arcing. This in turn serves to significantly reduce EMI. The reduction of EMI eliminates the need for expensive EMI suppression components that have previously been required for use with the motor brushes to ensure that EMI levels remain below regulated limits.

BRIEF DESCRIPTION OF THE DRAWINGS

The various advantages of the present invention will become apparent to one skilled in the art by reading the following specification and subjoined claims and by referencing the following drawings in which:

FIGS. 1a–1f illustrate a prior art winding pattern showing how two coils of a coil pair produce non-coincident commutation regions;

FIGS. 5a–5c and 6a–6c illustrate the angular positioning of the resultant magnetic axis of each coil of a given coil pair, relative to the position of the commutator bars to which the coils are attached, at the start of commutation, at the end of commutation, and at an intermediate point during commutation;

DETAILED DESCRIPTION OF THE PREFERRED EMBODIMENTS

Figure 2:
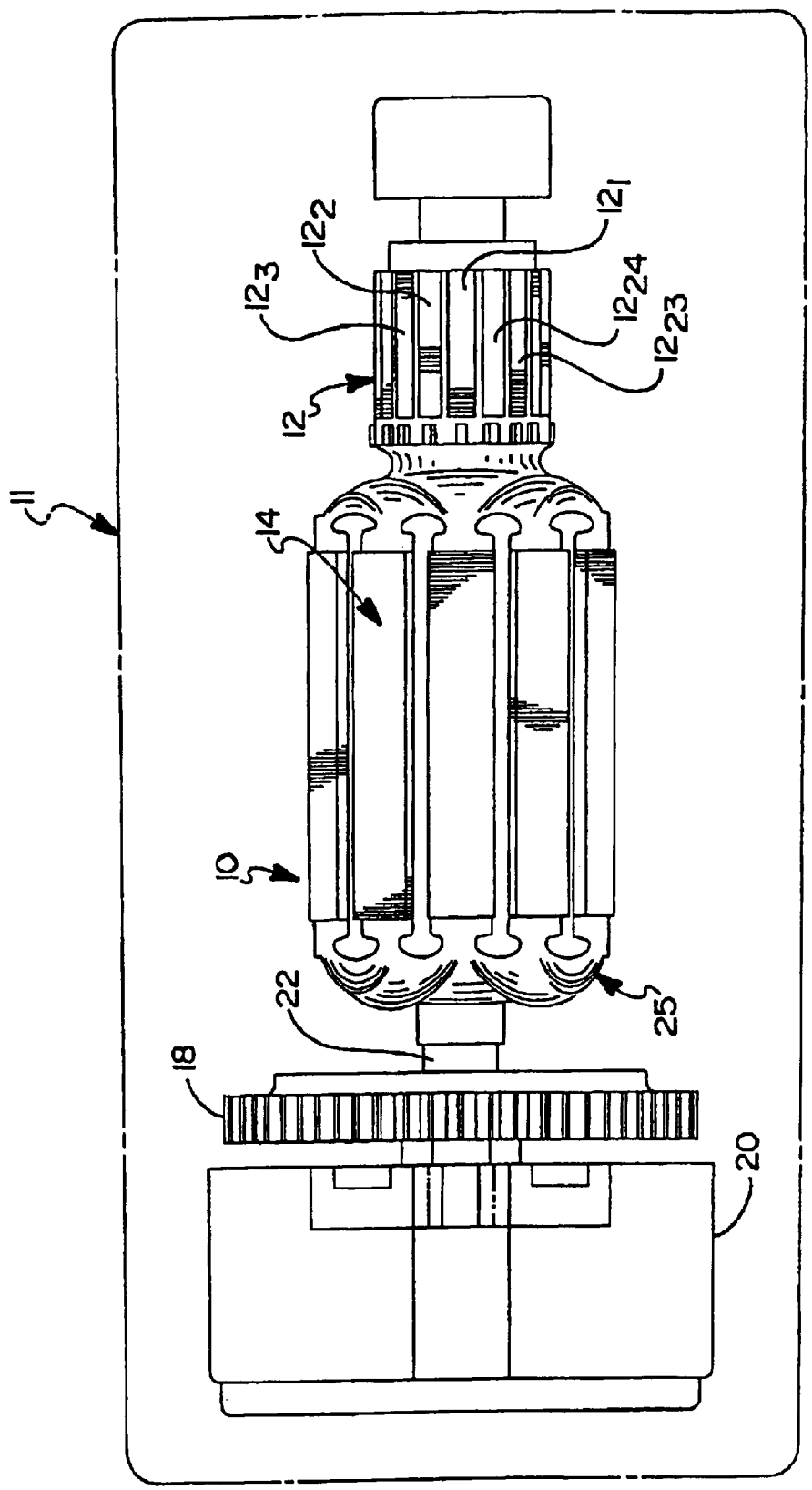
FIG. 2 is a side elevational view of an exemplary armature constructed in accordance with the teachings of the present invention.

Referring to FIG. 2, there is shown an armature 10 for a brush commutated electric motor 11 having a plurality of coils wound in accordance with the teachings of the present invention. The armature 10 includes a commutator 12 which, merely by way of example, includes 24 independent commutator segments $12_1$–$12_{24}$. A lamination stack 14 is used to support a plurality of 24 coils $25_1$–$25_{24}$ wound thereon. An armature shaft 22 extends through the lamination stack 14 and is fixedly coupled to a gear reduction assembly 20 and also to a fan 18. It will be appreciated, though, that the fan 18 and the gear reduction assembly 20 are optional and not essential to the armature 10 of the present invention, and shown merely because they are components that are often used in connection with an armature for an electric motor.

Figure 3:
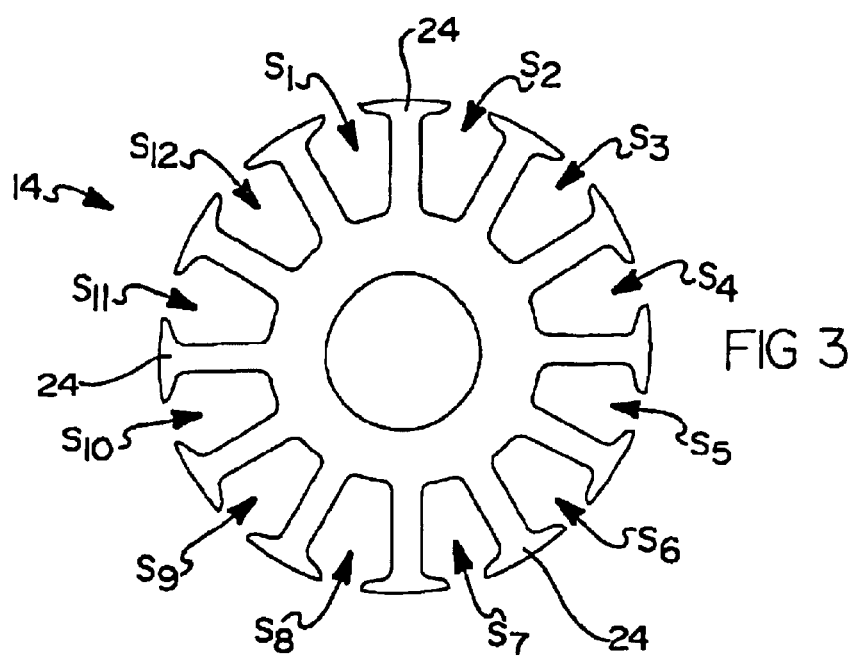
FIG. 3 is a simplified cross sectional end view of the armature of FIG. 2 illustrating a lamination stack for an armature having a plurality of twelve slots around which the coils of the armature are to be wound.

Referring to FIG. 3, the lamination stack 14 is illustrated without any coils wound thereon. The lamination stack 14 includes a plurality of radially projecting lamination posts or "teeth" 24. Twelve slots $S_1$–$S_{12}$ are formed between the posts 24. It will be appreciated immediately, however, that while twelve such slots are illustrated, that a greater or lesser plurality could be employed. The overall number of slots depends on the number of commutator segments and will always be one-half the number of commutator segments used.

Figure 4:
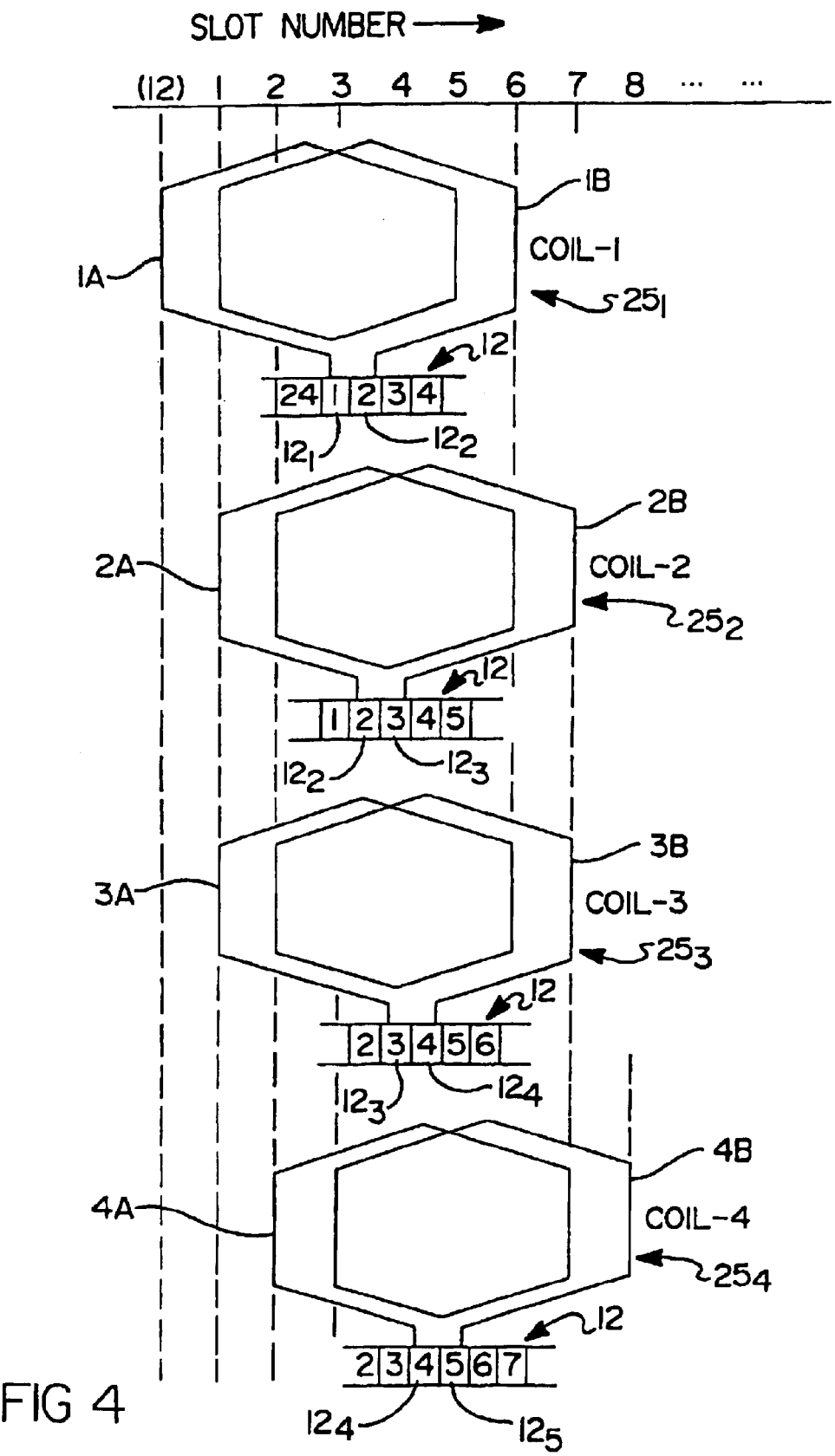
FIG. 4 illustrates in simplified fashion a coil winding pattern in accordance with the present invention.

Referring now to FIG. 4, the winding pattern of the present invention will be described. Coil number 1 ($25_1$) has a first subcoil portion 1A and a second subcoil portion 1B formed in series with subcoil portion 1A. Subcoil portion 1A has one end thereof coupled to commutator segment number $12_1$ and the end of second subcoil portion 1B is coupled to commutator segment number $12_2$. Subcoil portion 1A of coil $25_1$ includes a first plurality of turns, for example seven turns, which are wound around slots $S_{12}$ and $S_5$ of the lamination stack 14. Subcoil portion 1B of coil $25_1$ is then wound for a larger plurality of turns, in this example 17 turns, in slots $S_1$ and $S_6$ of the lamination stack 14. It will be appreciated that the precise number of windings of each subcoil portion can vary considerably, but in the preferred embodiment the number of turns between the subcoil portion 1B and portion 1A of coil $25_1$ is such that one has preferably about three times as many winding turns as the other. The number of turns also alternates between the subcoils, as will be described further, such that adjacent coils will always have the two first subcoil portions with differing numbers of winding turns, and the two second subcoil portions with differing numbers of winding turns.

Coil number 2 ($25_2$) also has a first subcoil portion 2A and a second subcoil 2B in series with one another. Subcoil portion 2A is wound in slots $S_1$ and $S_6$ with seventeen turns. Subcoil portion 2B is wound in series with portion 2A but around slots $S_5$ and $S_7$ of the lamination stack 14, and with seven winding turns. The end of subcoil portion 2A is coupled to commutator segment $12_2$ while the end of subcoil portion 2B is coupled to commutator segment $12_3$. The first subcoil portion 2A of coil $25_2$ overlaps the second subcoil portion 1B of coil $25_1$.

Coil number 3 ($25_3$) includes a first subcoil portion 3A and a second subcoil portion in series with one another 3B. Subcoil portion 3A is attached to commutator segment number $12_3$ and includes seven winding turns wound around slots $S_1$ and $S_6$. Subcoil portion 3B is formed in series with subcoil portion 3A and includes seventeen turns wound in slots $S_2$ and $S_7$, with the end thereof being coupled to commutator segment $12_4$.

Coil 4 ($25_4$) also includes a first subcoil portion 4A and a second subcoil portion 4B in series with subcoil portion 4A. Subcoil portion 4A has its end coupled to commutator segment $12_4$ and includes seventeen turns wound around slots $S_2$ and $S_7$. Subcoil portion 4B includes seven turns wound around slots $S_3$ and $S_8$, with the end thereof being coupled to commutator segment $12_5$. It will be noted that coil $25_4$ partially overlaps coil $25_3$. In effect, one of the subcoil portions of each adjacent pair of coils 25 overlap with each other.

The above-described pattern for coils $25_1$–$25_4$ is repeated until all of the coils (in this example 24 coils) are wound onto the lamination stack 14. Each of the ends of the coils $25_1$–$25_{24}$ are further secured to immediately adjacent pairs of commutator segments $12_1$–$12_{24}$. For example, coil $25_5$ has its ends secured to commutator segments $12_5$ and $12_6$, coil $25_6$ to segments $12_6$ and $12_7$, and so forth.

The above-described winding pattern significantly improves the commutation performance of all of the second coil portions of the coils 25. Splitting each coil 25 into first and second subcoil portions allows each first subcoil portion to shift its magnetic axis away (i.e., laterally), from the position it would have otherwise had in a traditional two-coil-per-slot. This is illustrated in FIGS. 5a–5c and FIGS. 6a–6c. These figures each show a coil consisting of two series connected subcoils of unequal turns as disclosed previously. Each subcoil has a magnetic axis as shown. The resultant magnetic axis of the complete coil resides between the magnetic axes of the subcoils, but it is closer to the larger of the two. In FIGS. 5a and 6a, the orientation of the resultant magnetic axis of each of coils 1 and 2 ($25_1$ and $25_2$) can be seen to fully overlap, as evidenced by the alignment of commutation regions 30 and 32 for each of the two coils 1 and 2.

In FIGS. 5b and 6b, each of coils 1 and 2 are shown at the beginning of commutation. In FIG. 5b, the resultant magnetic axis of coil 1 is shifted laterally to the right in the drawing figure due to the weighting of the turns of the two subcoil portions of coil 1. Its resultant magnetic axis aligns with the beginning of commutation region 30 of coil 1 as indicated by the vertical line 36. In this example, the resultant magnetic axis of coil 1 is advanced 15 degrees, or one-half the width of the commutation region 30. The axis of the field pole can be seen to fall at the center of brush 40. In FIG. 6b, the resultant magnetic axis of coil 2 is shifted laterally to the left due to the weighting of the two subcoil portions of coil 2. The resultant magnetic axis of coil 2 thus also aligns with vertical line 36 at the beginning of commutation of coil 2. As such, both of coils 1 and 2 begin commutation at the same angular point (i.e. represented by line 36) relative to the axis of the field pole and the brush 40.

Figure 1:
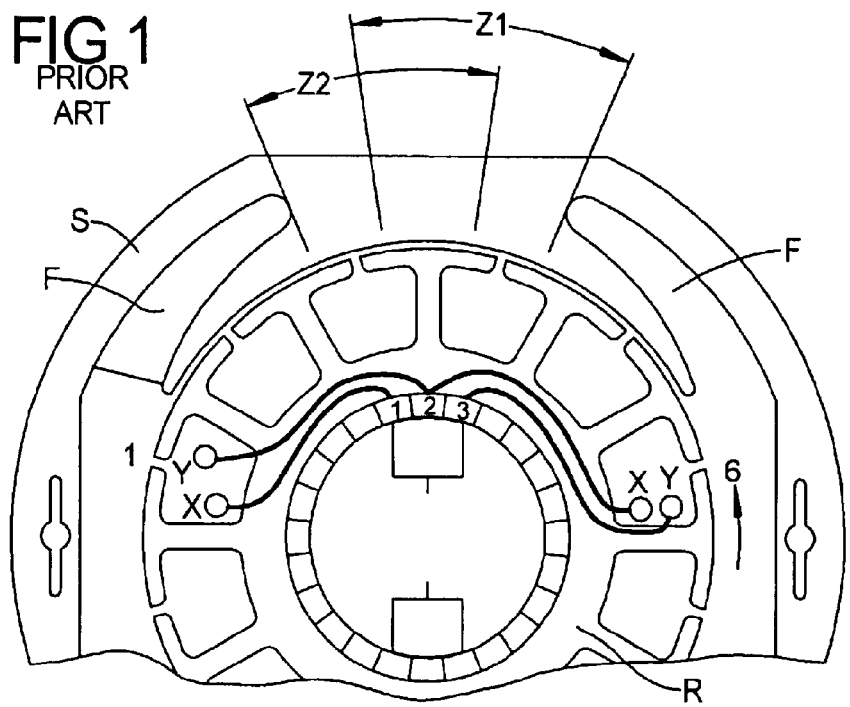
FIG. 1 is a simplified diagrammatic end view of an armature having a traditional coil winding pattern employed, and illustrating how the commutation zone of the second coil of a two-coil-per-slot winding arrangement causes the commutation zone of the second coil to lag behind the commutation zone of the first coil, thus leading to brush arcing.
Figure 5:
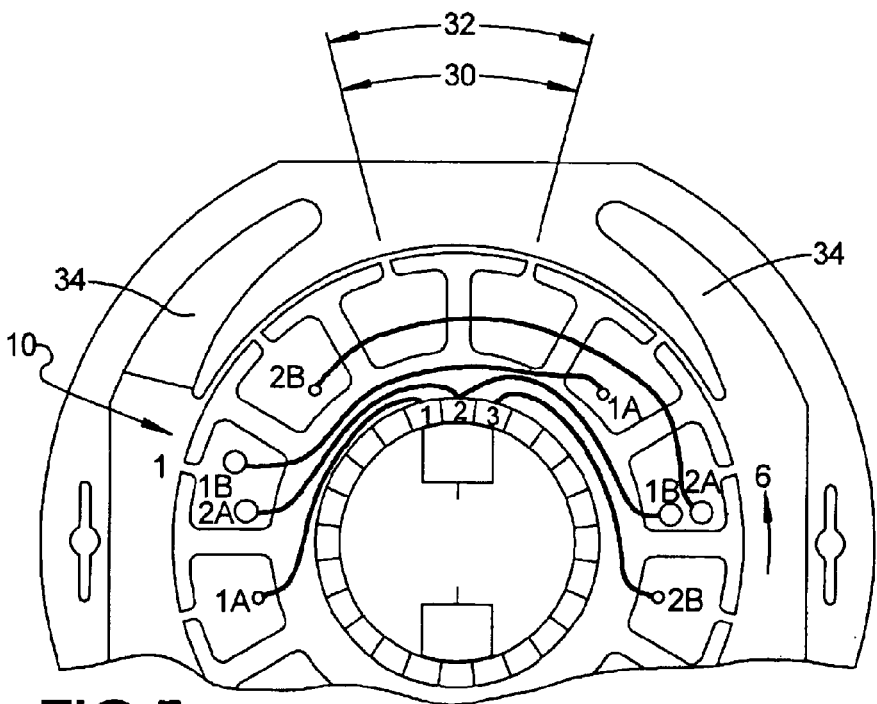
FIG. 5 is a simplified end view of the armature illustrating how the winding pattern produces commutation zones for the first and second coil with subcoil portions which are radially aligned with one another to improve commutation efficiency and reduce brush arcing.
Figure 5A:
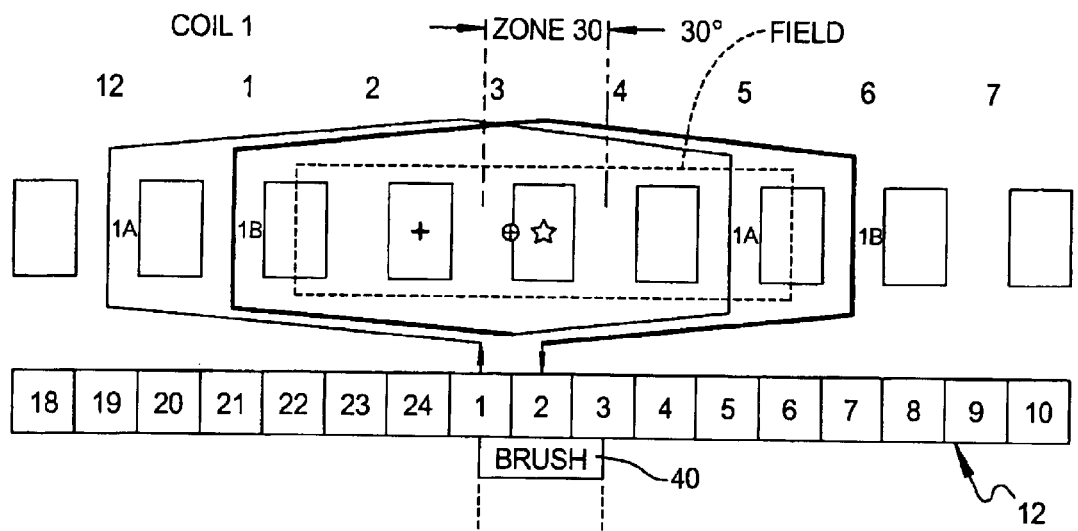
Figure 6A:
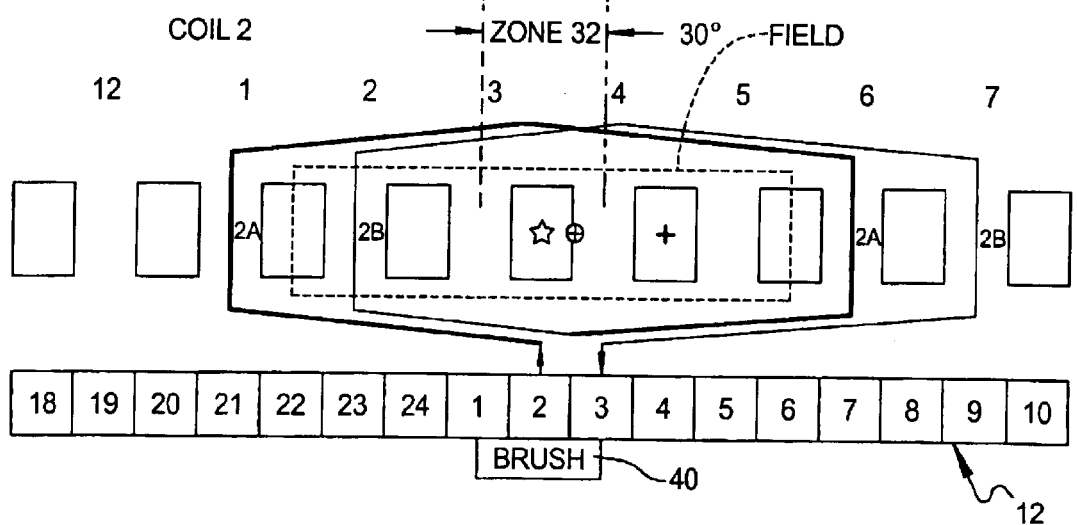

In FIGS. 5c and 6c, each of coils 1 and 2 are shown at the end of their respective commutation regions 30 and 32. In FIG. 5c, the resultant magnetic axis of coil 1 is indicated by the vertical line 38. In FIG. 6c, the resultant magnetic axis of coil 2 falls at the same angular position as coil 1, as also indicated by vertical line 38. Commutation regions 30 and 32 fully overlap one another, as evidenced in FIGS. 5b, 6b and 5c, 6c, and are in a common overlapping region with respect to the field coil 34 shown in FIG. 5.

Further, it can be seen by examining FIGS. 5, 5a–5c and 6a–6c that the commutation regions 30 and 32 are also in a common angular position with respect to the commutator bars 12 to which the coils are connected. With a turns ratio between the two subcoils of about 3:1, this winding pattern smoothes out the magnetic "unevenness" between adjacent coils, which is a drawback with traditional two-coil-per-slot winding patterns. This, in connection with the shifting of the resultant magnetic axes of each coil, serves to significantly improve the commutation efficiency of the motor and to reduce the overall brush arcing.

The winding pattern employed on the armature 10 of the present invention also serves to significantly reduce the cost of constructing the armature by eliminating components that would otherwise be needed to sufficiently attenuate the EMI that results from traditional two-coil-per-slot winding patterns. Typically, inductive components are required to form a choke circuit associated with each armature brush. These additional components increase the overall cost of manufacturing a motor, as well as increase the complexity of the task of replacing the brushes during repair procedures.

The apparatus and method of the present invention thus allows an armature to be formed which significantly reduces brush arcing, and therefore the EMI that is present with traditional two-coil-per-slot armature constructions for all brush commutated electric motors. The apparatus and method of the present invention further does not increase the complexity of the manufacturing process or require additional component parts that would otherwise increase the overall cost of construction of an armature.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An electric motor comprising:
    an armature having a plurality of spaced-apart posts defining a plurality of winding slots therebetween;
    a commutator having a plurality of commutator bars that number twice that of said winding slots;
    at least one brush disposed adjacent said commutator;
    a stator disposed coaxially with the armature, said stator having a plurality of spaced apart field coils;
    said armature including:
        a first coil having a first subcoil portion and a second subcoil portion having differing numbers of turns;
        said first subcoil portion being wound in a first pair of spaced apart ones of said slots;
        said second subcoil portion being wound in a second pair of spaced apart ones of said slots that are offset from said first pair of spaced apart slots;
        a second coil having a first subcoil portion and a second subcoil portion having differing numbers of turns;
        said first subcoil portion of said second coil being wound in said second pair of spaced apart slots so as to overlap said second subcoil portion of said first coil;
        said second subcoil portion of said second coil being wound in a third pair of spaced apart ones of said slots offset from said second pair of spaced apart slots;
        wherein both of said coils begin commutation at the same angular position relative to said brush; and
        wherein both of said coils end commutation at the same angular position relative to said brush.

2. The electric motor of claim 1, wherein one of said first and second subcoil portions of said first coil has approximately three times a number of winding turns as the other.

3. The electric motor of claim 1, further comprising a third coil having first and second subcoil portions that are wound in the same said slots as said subcoil portions of said second coil.

4. An electric motor having an armature, the electric motor comprising:
    a lamination stack having a plurality of radially extending posts, said posts forming a plurality of slots therebetween, said slots being arranged in a circumferential pattern;
    a plurality of coils wound around said slots, said coils being arranged in pairs about said lamination stack;
    each said coil being divided into first and second subcoil portions, with said first subcoil portion having a first plurality of winding turns and said second subcoil portion having a second plurality of winding turns, and wherein said first and second subcoil portions are wound in different, circumferentially offset pairs of said slots and coupled to designated pairs of commutator segments of a commutator;

wherein a first pair of said coils are wound in an overlapping fashion such that the first subcoil portion of a second one of said first pair of coils is wound in the same slots as said second subcoil portion of a first one of said first pair of coils, and said second subsoil portion of said second one of said first pair of coils is wound in a pair of slots offset by one slot position from said slots that said second subcoil portion of said first one of said first pair of coils is wound in; and wherein a second pair of coils circumferentially offset from said first pair of coils is further wound such that a first subsoil portion of a first one of said second pair of coils is wound in the same slots as said first subcoil portion of said second coil of said first pair of coils, and said second subcoil portion of said first one of said second one of second pair of coils is wound in the same slots as said second subsoil portion of said second coil of said first pair of coils; and wherein a resultant magnetic axis of each said coil is at the same angular position relative to the pair of commutator segments to which each said coil is secured; and wherein said same angular position enables coincident commutation zones to be formed for each of said coils.

5. The electric motor of claim 4, wherein one of said first and second subcoil portions of each said coil has a greater number of winding turns that the other of said subcoil portions.

6. The electric motor of claim 4, wherein one of said first and second subcoil portions of each said coil has approximately three times the number of winding turns as the other of said subcoil portions.

7. An electric, rotating machine comprising:
a stator having a plurality of field coils, wherein said field coils are spaced apart to form gaps therebetween;
an armature having a plurality of coils wound thereon such that a magnetic axis of a first one of said coils is advanced, relative to a given pair of said field coils when said first coil is excited, and a magnetic axis of a second one of said coils is retarded, relative to said given pair of field coils when said second coil is excited; and
wherein said first and second coils complete commutation while passing through coincident angular regions relative to said brush.

8. The machine of claim 7, wherein each of said first and second coils is segmented into two subcoil portions coupled in series.

9. The machine of claim 8, wherein said subcoil portions of said first and second coils are wound such that at least one of said subcoil portions of each are wound in a common pair of slots of said armature.

10. An electric motor comprising:
an armature having a plurality of spaced apart posts defining a plurality of spaced apart winding slots;
a stator disposed coaxially with the armature, said stator having a plurality of spaced apart field coils defining an angular region between each adjacent pair of said field coils;
said armature including:
a first coil having a first subcoil portion and a second subcoil portion;
said first subcoil portion having a first plurality of winding turns and being wound in a first pair of spaced apart ones of said slots;
said second subcoil portion having a second plurality of winding turns and being wound in a second pair of spaced apart ones of said slots that are offset from said first pair of spaced apart slots;
a second coil having first and second subcoil portions wound in third and fourth pairs, respectively, of spaced apart ones of said slots;
wherein said subcoils of said first coil are wound with different numbers of winding turns to shift a resultant magnetic axis of said first coil so that said resultant magnetic axis lies at a first predetermined angular position relative to a first pair of commutator bar to which said first coil is secured;
wherein said subcoils of said second coil are wound with differing numbers of turns to align a resultant magnetic axis of said second coil at a second predetermined angular position to a second pair of commutator bars to which said second coil is secured; and
wherein said first and second predetermined angular positions define the same angular position, and wherein said coils have coincident commutation regions.

11. An electric motor of claim 10, wherein said subcoil portions of each said coil have differing numbers of winding turns.

12. An electric motor comprising:
an armature having a plurality of spaced apart posts defining a plurality of spaced apart winding slots;
a stator disposed coaxially with the armature, said stator having a plurality of spaced apart field coils defining an angular region between each adjacent pair of said field coils;
said armature including:
a first coil having a first subcoil portion and a second subcoil portion;
said first subcoil portion having a first plurality of winding turns and being wound in a first pair of spaced apart ones of said slots;
said second subcoil portion having a second plurality of winding turns and being wound in a second pair of spaced apart ones of said slots that are offset from said first pair of spaced apart slots;
a second coil having first and second subcoil portions wound in third and fourth pairs, respectively, of spaced apart ones of said slots;
wherein a resultant magnetic axis of said first coil is positioned at a first angular point relative to a pair of commutator bars to which said first coil is coupled;
wherein a resultant magnetic axis of said second coil is positioned at a second angular point relative to a pair of commutator bars to which said second coil is coupled, said first and second angular points defining the same angular point; and
wherein both of said coils begin and complete commutation within a predetermined, coincident angular commutation region relative to said given pair of field coils.

13. The electric motor of claim 12, wherein said first and second subcoil portions of each of said first and second coils are wound with differing numbers of winding turns.

* * * * *